United States Patent [19]

Laux

[11] Patent Number: 5,263,680
[45] Date of Patent: Nov. 23, 1993

[54] MOTOR-TO-SPOOL COUPLING FOR ROTARY-TO-LINEAR DIRECT DRIVE VALVE

[75] Inventor: Kenneth Laux, Newhall, Calif.

[73] Assignee: HR Textron, Inc., Valencia, Calif.

[21] Appl. No.: 979,754

[22] Filed: Nov. 23, 1992

[51] Int. Cl.⁵ .................... F15B 13/044; F16K 31/04
[52] U.S. Cl. ........................ 251/129.11; 137/625.65; 384/215
[58] Field of Search ............. 137/625.65; 251/129.11; 384/215, 220

[56] References Cited

U.S. PATENT DOCUMENTS 4,546,338 10/1985 Idogaki et al. .
4,641,812 2/1987 Vanderiaan et al. .
4,742,322 5/1988 Johnson et al. .
4,789,132 12/1988 Fujita et al. .

Primary Examiner—Gerald A. Michalsky
Attorney, Agent, or Firm—Robbins, Berlinger & Carson

[57] ABSTRACT

A coupling between a direct drive valve motor and a spool for converting rotary-to-linear motion. A bushing is coupled to the spool and defines an opening therein. An end of a shaft carried by the rotor of the motor is received within an opening in the busing. The bushing is outwardly expandable upon the receipt of the end of the shaft to couple the shaft to the spool with minimal frictional forces and near zero backlash.

7 Claims, 2 Drawing Sheets

MOTOR-TO-SPOOL COUPLING FOR ROTARY-TO-LINEAR DIRECT DRIVE VALVE

FIELD OF THE INVENTION

This invention relates to direct drive valves and more particularly to a direct drive valve in which rotational motion of a motor rotor is converted into linear motion of a spool valve and more specifically to the coupling between the rotor and the spool valve.

BACKGROUND OF THE INVENTION

Torque motor driven spool valves are well known in the art including such valves which operate through the utilization of a rotary torque motor having a drive member extending from the rotor thereof into contact with the spool valve to directly reciprocate the spool valve within a bore provided in the valve housing. When the spool valve reciprocates it controls the flow of fluid from a source thereof to a load in response to the electrical signals applied to the drive motor.

Direct drive servo valves of the type above mentioned are illustrated in the following U.S. Pat. Nos. 2,697,016, 2,769,943, 4,339,737, 4,197,474, 4,452,423, 4,793,337, 5,052,441 and 5,040,568.

In all such direct drive servo valves known to Applicant, the spool valve is reciprocated by the free end of the motor shaft contacting the spool through an eccentrically mounted pin having a substantially spherical drive tip. The drive tip is inserted into a well or annular groove formed in the spool. The dimensional relationship between the spherical drive tip and the spool is such as to provide minimal frictional forces and near zero backlash. Utilizing such dimensions necessitates lapping and fitting operations which add greatly to the expense of such devices.

SUMMARY OF THE INVENTION

In accordance with the present invention there is provided a direct drive valve which includes a valve driven by a motor having a stator and rotor. A shaft is carried by the rotor and has a distal end which is received within an opening provided in a bushing means. Means encircling the bushing means and coupling the bushing to the valve is provided. The bushing means is outwardly expandable upon the distal end of the shaft being inserted into the opening.

DETAILED DESCRIPTION

Figure 1:
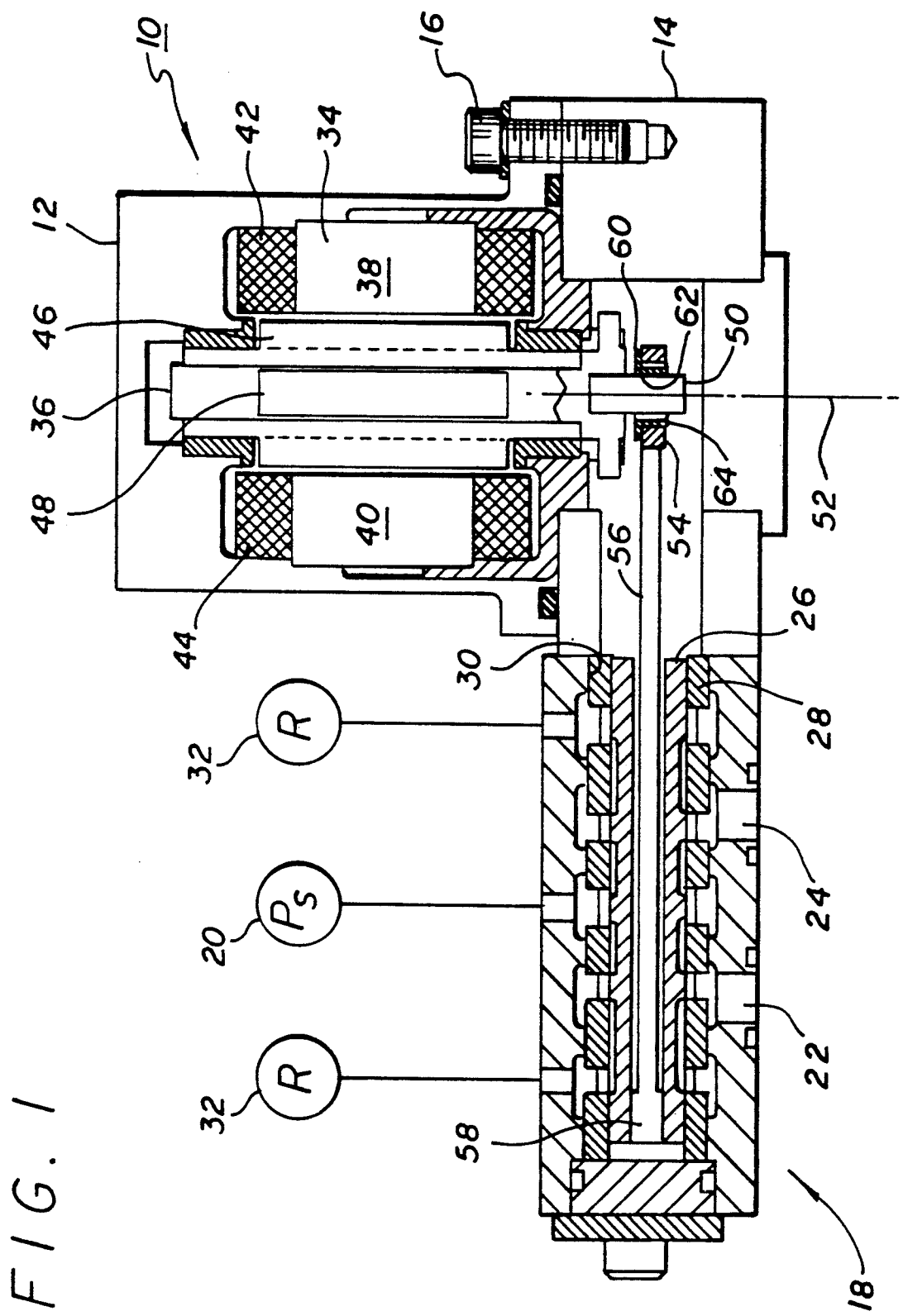
FIG. 1 is a cross-sectional view of a direct drive valve constructed in accordance with the principles of the present invention.

Referring now more specifically to FIG. 1, there is shown a direct drive valve 10 constructed in accordance with the principles of the present invention. As is therein shown, the valve 10 includes a motor 12 which is attached to a housing 14 by fasteners such as bolts 16 as is well known to those skilled in the art. Within the housing 14 there is disposed a reciprocal valve means shown generally at 18 which controls the flow of fluid under pressure from a source 20 thereof to ports 22 and 24 for the control of a load apparatus (not shown). The valve 18 includes a spool 26 which is reciprocally mounted within a sleeve 28 which in turn is mounted within a bore 30 provided within the housing 14. Appropriate ports are provided in the sleeve for communication with the control ports 22 and 24 as well as the source of fluid 20 and the return 32.

The spool 26 is reciprocated within the sleeve 28 to meter the flow of fluid as is well known to those skilled in the art. The reciprocation of the spool 26 is accomplished through coupling to the motor 12. The motor 12 includes a stator 34 and a rotor 36. The stator 34 includes magnetic pole pieces 38 and 40 and drive windings 42 and 44. These drive windings are connected to receive an electrical drive signal from an external source (not shown). This electrical drive signal controls the positioning of the spool 26 in a manner to be described below.

The drive motor 12 rotor 36 includes permanent magnets 46 carried on a shaft 48 which is supported by appropriate bearings as is well known to those skilled in the art. The shaft 48 includes a distal end in the form of a pin 50 extending therefrom. The pin 50 is eccentrically disposed with respect to the center line 52 of the shaft 48. The pin 50 is coupled to a fitting 54 which is secured to a rod 56 which in turn is rigidly attached at its opposite end 58 to the spool valve 26.

The fitting 54 carries a bushing 60 which receives the pin 50 on shaft 48. The pin 50 makes contact with the bushing 60 at pre-selected positions as shown at 62. The pin 50 is dimensioned with respect to the bushing 60 in such a way that the bushing 60 is caused to outwardly expand upon insertion of the pin 50 into the bushing in such a way that it contacts the fitting 54 to form an intimate engagement therewith as is shown at 64. The bushing 60 may take a variety of shapes generally in the cross-sectional form of a washer-type configuration so as to provide low friction contact between the pin 50 and the bushing 60. As a result of the dimensional relationship between the bushing and the pin 50, there is substantially zero backlash because there is a press fit between the two. Also because of the press fit and the fact that the bushing 60 expands outwardly when the pin 50 is received therein, there is an automatic self adjustment as the motor 12 cycles during use. It is evident that the structure as shown in FIG. 1 and as above described is relatively inexpensive to manufacture and assemble and the parts therein are interchangeable with other similar type direct drive valves, that is, since there is no lap fitting, specific parts do not need to be retained together throughout their lifetimes.

Figure 2:
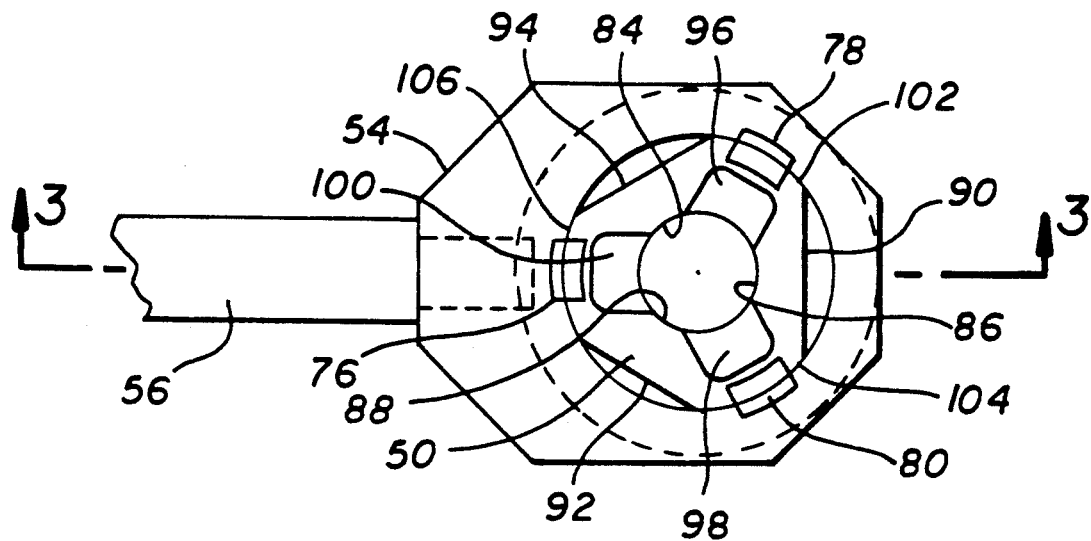
FIG. 2 is a bottom plan view of the coupling between the rotor shaft and the valve.
Figure 3:
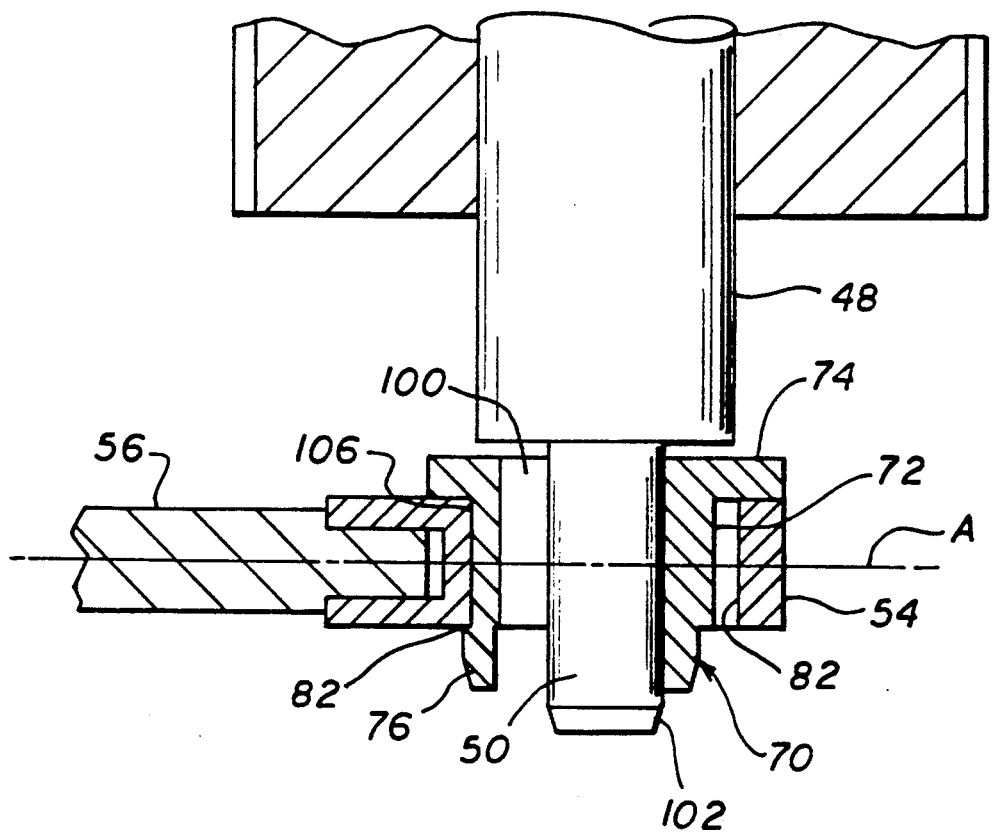
FIG. 3 is a cross-sectional view taken about the lines 3—3 of FIG. 2.

By referring now more specifically to FIGS. 2 and 3, there is illustrated one specific form of the bushing 60 and its relationship with the pin 50 on the shaft 48. FIG. 2 is a bottom plan view illustrating the bushing in position within the fitting 54. The bottom plan view of FIG. 2 is taken by rotating FIG. 3 ninety degrees clockwise about axis A (when viewed from the right) into the plane of the drawing. The bushing 70 of FIGS. 2 and 3 includes a body 72 having an outwardly directed flange 74 extending from the upper portion thereof. Three downwardly extending fingers 76, 78 and 80 secure the bushing 70 in place within the opening 82 provided in the fitting 54. As is seen particularly in FIG. 3, there is a protrusion or shoulder 82 displaced from the end of the finger 76 to permit the finger to snap back and the shoulder to engage the fitting 54 once the bushing has been snapped into place by inserting the body 72 into the opening 82. The bushing includes three arcuate surfaces 84, 86 and 88 which contact the outer surface of the pin 50. As can be seen, the bushing includes flat sides 90, 92 and 94 spaced inwardly from the opening 82 within the fitting 54. The bushing 70 is also relieved as shown at 96, 98 and 100 to cause the body 72 to be more flexible. The bushing is dimensioned such that the outer diameter of the pin 50 is slightly larger than the diameter formed by the segments of the arcuate surfaces 84, 86, and 88. However, because of the taper 102 on the distal end of the pin 50, the pin 50 may easily be inserted into and received by the opening provided in the bushing 70 as is illustrated in FIG. 3. As the pin 50 is inserted into the opening in the bushing 70, the bushing is outwardly expandable thus causing more intimate contact between the outer surfaces 102, 104 and 106 of the bushing and the opening 82 within the fitting 54.

The fitting 54 may be constructed of any material desired and may be affixed to the shaft 56 by threading, being adhesively secured or otherwise bonded thereto and may have any geometric configuration desired as is well known to those skilled in the art. The bushing 70 may likewise be formed of various materials such as molded plastic, beryllium copper, or the like so long as the appropriate low friction contact is provided between the outer surface of the pin 50 and the bushing as well as the outwardly expansible characteristics of the bushing when the pin 50 is received therein.

What is claimed is:

1. A coupling for a rotary-to-linear direct drive valve having a motor including a stator and a rotor and a valve driven by said motor comprising:
   (A) a shaft carried by said rotor and having a distal end;
   (B) a bushing means defining an opening therein;
   (C) means encircling said bushing and coupling said bushing to said valve;
   (D) said distal end of said shaft being received in said opening; and
   (E) said bushing means being outwardly expandable upon said distal end of said shaft being inserted into said opening.

2. A coupling for a rotary-to-linear direct drive valve as defined in claim 1 wherein said means encircling said bushing is a fitting defining a second opening therein, said bushing being received within said second opening.

3. A coupling for a rotary-to-linear direct drive valve as defined in claim 2 wherein said bushing opening includes at least three segments of a circle having a first diameter, each segment defining an arcuate surface for contacting said distal end of said shaft.

4. A coupling for a rotary-to-linear direct drive valve as defined in claim 3 wherein said distal end of said shaft includes a pin having a second diameter, said second diameter being larger than said first diameter.

5. A coupling for a rotary-to-linear direct drive valve as defined in claim 4 wherein said bushing means includes an outer surface, said outer surface engaging said fitting opening at spaced apart positions with a void defined by said outer surface and said fitting opening and interspersed between said spaced apart positions.

6. A coupling for a rotary-to-linear direct drive valve as defined in claim 5 wherein said bushing means outer surface defines an intermittent shoulder means for locking said bushing means into said fitting opening.

7. A coupling for a rotary-to-linear direct drive valve as defined in claim 2 wherein said means coupling said bushing to said valve includes a rod, said fitting being affixed to said rod.

* * * * *